United States Patent [19]
Kononko et al.

[11] 3,937,623
[45] Feb. 10, 1976

[54] METHOD OF MAKING GLASS TUBES

[76] Inventors: Vasily Porfirovich Kononko, ulitsa Semashko, 21, kv. 43, Kiev; Konstantin Timofeevich Bondarev, ulitsa Nizhnyaya Pervomaiskaya, 33, kv. 171, Moscow; Alexandr Alexandrovich Krivokon, Bereznyakovksaya ulitsa, 14, kv. 83, Kiev; Nikolai Nikiforovich Kovshar, Steklozavodskaya ulitsa, 8, kv. 25, Kievskaya oblast, poselok Bucha; Ljudmila Mikhailovna Ivanova, Bereznyakovskaya ulitsa, 14, kv. 18, Kiev; Elena Gavrilovna Frolova, Leningradskoe shosse, 118, korpus 1, kv. 108, Moscow; Nikolai Antonovich Shestak, ulitsa Serafimovicha, 7, kv. 127, Kiev; Nikolai Leontievich Shevchenko, Steklozavodskaya ulitsa, 6, kv. 17, Kievskaya oblast, poselok Bucha, all of U.S.S.R.

[22] Filed: July 25, 1973

[21] Appl. No.: 382,560

[52] U.S. Cl. ................................. 65/88; 65/192
[51] Int. Cl.² ................................. C03B 15/14
[58] Field of Search ............................ 65/192, 86, 88

[56] References Cited
UNITED STATES PATENTS
3,754,883   8/1973   Keefer et al. ........................ 65/88

Primary Examiner—Arthur D. Kellogg
Attorney, Agent, or Firm—Haseltine, Lake & Waters

[57] ABSTRACT

A method of making glass tubes in which forced cooling of the tube is effected from the inside thereof in an annealing section of a tube fabricating plant.

6 Claims, 1 Drawing Figure

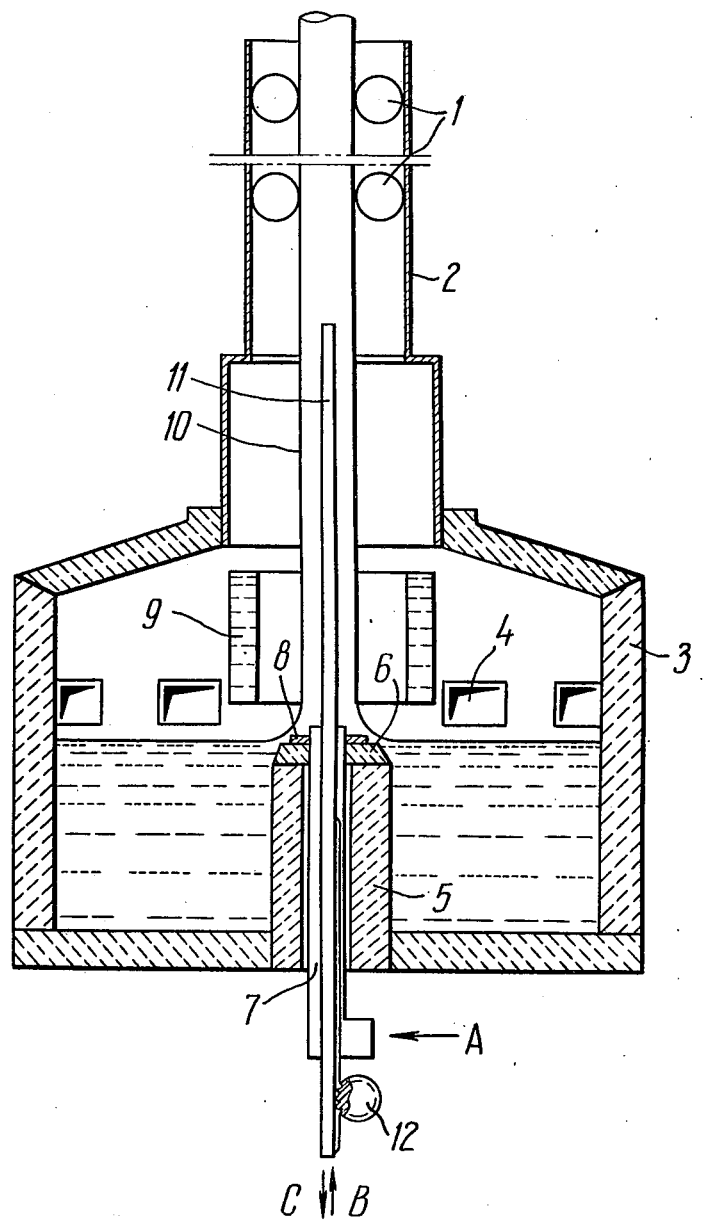

METHOD OF MAKING GLASS TUBES

FIELD OF INVENTION

The present invention relates to methods of producing glass tubes.

BACKGROUND

Procedures are widely known for making glass tubes, for example, by drawing a melt from its free surface. Such procedures enable mechanized fabrication of glass tubes in a rather broad range of size.

One technique of production of glass tubes comprises the following major steps: batch mixing, glass melting, glass tube forming followed by annealing and cooling, breaking-off (cutting-off), annealing the tubes produced in annealing devices and cutting them to specified lengths.

The forming of glass tubes with subsequent annealing and cooling as well as the breaking-off (cutting-off) of the tube are effected in upright drawing plants comprising a drawing compartment wherein the tube is formed, and a drawing pit equipped with guide rolls adapted to draw the glass tube from the free surface of the melt.

The drawing compartment, which is about 2 meters in diameter is heated by natural gas with the help of tangential burners. The compartment is open to the working end of a glass-melting furnace through a wide throat along which the melt is continually admitted into the compartment.

At the center of the compartment, there is a metal pipe through which air is blown inside the tube being formed to provide the manufacture of tubes of specified dimensions. From the exterior, a tube of requisite size is formed with the help of a water cooler which is free to move vertically with respect to the surface of the melt.

The dimensions of the tube being made are adjusted by varying the amount of air admitted into the forming section, the spacing between the cooler and the surface of the melt and the drawing speed.

Upon forming, the tube is transferred to the drawing pit wherein annealing is performed in a certain temperature range, depending on a given chemical composition of the glass, and subsequent cooling to a temperature at which the tube breaks off.

However, upon leaving the upright drawing plant, the tubes are characterized by inadequate mechanical strength and heat resistance which are necessary for reliability. These characteristics result from spontaneous irregular annealing to which the tube may be subjected. Since each tube is formed at a pressure created by blasting the air inside the tube being formed, the air is in a parallel flow with the direction of drawing of the glass tube. In this case, the air is heated in the forming section to such a temperature that it does not cool the tube in the annealing range and the remaining portion of the pit. As each glass tube is cooled in the annealing section only from its exterior, large tensile stresses are generated on the tube internal surface, an additional annealing of the tubes in special annealing outfits becoming therefore imperative.

A reduction in the tensile stresses resulting from repeated heat treatment in the above-mentioned annealing outfits tends to improve mechanical and heat-resisting characteristics of the glass tubes.

It should be noted that most reasonable in terms of the strength characteristics of the tube is distribution of the stresses along the tube thickness such that both its internal and external surfaces are in a compressed state. However, present-day techniques do not insure such stress distribution at which the tubes may have enhanced mechanical and heat-resisting properties.

Additional annealing of glass tubes complicates the production techniques and requires large floor areas for arranging the annealing outfits. Moreover, carrying the glass tubes to and within the annealing plants results in breakage thereby diminishing the yield of finished products.

SUMMARY OF INVENTION

A principal object of the invention is to provide an improved method of making glass tubes by using such technological operations as will allow simplifying the production technique as a whole, materially diminishing production floor areas and enhancing the process output.

The above and other objects of the invention are achieved by the fact that in making glass tubes by the upright drawing of a melt from its free surface and geometric forming with the aid of an air flow blown inside the tubes and heated in a forming section, with subsequent annealing of the tube and its cooling to an ambient temperature, according to the invention, the tube is subjected to forced cooling from the inside in the annealing section.

It is particularly advantageous that a gaseous coolant, moving in a parallel flow with the tube being formed, and the above-mentioned forming air flow be supplied into the annealing section through a pipe arranged inside the tube being formed. The pipe may be evacuated by drawing off the forming air in a counterflow to draw ambient cooling air into the tube.

To create rarefaction in the annealing section, it is preferred that a tubular member through which the air can be drawn off from the annealing and forming sections be introduced into the tube being made.

The present invention consists essentially of the following:

The tube being subjected to forced cooling from the inside in the annealing section can be uniformly cooled in the pit of a upright drawing plant. The external surface of the tube is cooled due to heat transfer to the ambient air, the tube cooling rate being dependent in this case on the pit design to be determined in accordance with the requirements imposed on the tube characteristics. As to the rate of cooling of the tube from the inside in the annealing section, this is determined by the amount and temperature of the air in this section. Therefore the supply of the gaseous coolant into the annealing section or the drawing off of the hot forming air from the forming and annealing sections has a favorable effect when the tube is cooled from the inside.

Owing to regular cooling from both sides, the glass tube is annealed in such a manner as to acquire such mechanical properties that the need for additional annealing is completely eliminated.

The obviating of a technological operation, the repeated annealing of the glass tubes, reduces the production cycle and simplifies the production technique along with a substantial decrease in the requisite production floor areas. With a single annealing operation effected directly in the upright drawing plants, the production floor area requirements in making glass tubes are reduced by 30–50 percent. The fabrication of glass tubes by using the hereinbefore described techniques makes it possible to increase the yield of finished products by 10–20 percent.

BRIEF DESCRIPTION OF DRAWING

The invention is next further exemplified by a detailed description of a specific embodiment thereof, taken in conjunction with the accompanying drawing in which the sole FIGURE diagrammatically and in section illustrates both the apparatus and method of the invention.

DETAILED DESCRIPTION

With reference to the drawing, a plant is composed of two main units: a device for drawing glass tubes which constitutes several pairs of guide rolls 1 arranged in a drawing pit 2, and a cylindrical compartment 3 with molten glass located beneath the pit 2 and connected to a working end of a glassmelting furnace through a wide throat (not shown in the drawing).

The walls of the compartment 3 are provided with ports 4 for arranging burners (not shown in the drawing) adapted to maintain the requisite temperature in the compartment.

The central portion of the compartment 3 accommodates a ceramic blowpipe 5 mounting a tapered hollow ceramic bushing 6. The compartment 3 incorporates a coaxial metal pipe 7 resting with its flange 8 on the tapered bushing 6.

In addition, the plant is furnished with a hollow annular cooling 9 mounted movably in relation to the vertical axis of the plant. The hollow annular water cooler 9 is adapted to form a tube 10 from the external side acting at the same time as a shield protecting the tube being formed from the flame space of the compartment 3.

Introduced into the tube 10 being formed is a tubular member 11 through which a coolant is fed into the annealing range. The member 11 is allowed to move vertically with the aid of a lifting gear 12. The member 11 may be a heat-resistant pipe or a tubular annular cooler.

The method of producing glass tubes on the above-described plant is effected by using the following sequence of operations;

The temperature in the compartment 3 should exceed by 30°–50°C the working temperature at which the glass tubes are made. In this case, the cooler 9 is carried outside the compartment 3 to be arranged in the bottom part of the pit.

A bait (not shown in the drawing) is introduced into the melt through the pit and is immersed into the melt around the tapered ceramic bushing 6. Following that the annular cooler 9 is lowered into the compartment and the burners heating the compartment are cut off.

As the compartment cools down to a temperature below the working temperature by 30°–50°C, an electric motor is energized the motor being adapted to rotate the guide rolls 1 and to lift synchronously the bait.

Simultaneously, the burners heating the compartment 3 are cut in. After the guide rolls 1 have caught the formed portion of the tube and the bait is separated from the glass tube, air is supplied inside the tube 10 being formed (along arrow A) to adjust the diameter of the glass tube (a forming air flow). By changing the distance between the lower edge of the cooler 9 and the melt level and adjusting the drawing speed, a stable operation of the tube drawing device is attained. As the stable operating conditions are obtained, a member 11 adapted for feeding the coolant into the annealing section is introduced into the tube interior.

The coolant for forced cooling of the tube from the inside is supplied along arrow B in a parallel flow with the tube being formed to form an air flow.

The amount of the cooling agent travelling inside the tube in the annealing range insures regular cooling of the tube from both sides, i.e., from its interior and exterior. Various gaseous substances may be used as coolants, such as compressed air, flue gases, water vapors, etc.

In pits 12 m high, tubes with an outside diameter of 44 mm. and wall thickness of 4.0 mm. are made with a drawing speed of 330 m/hr. A cooler with an inside diameter of 450 mm. is arranged at a distance of 100 mm. above the surface of the melt. The pressure of the air supplied by a fan amounts to 40 mm. $H_2O$ at the base of a metal pipe with an inside diameter of 60 mm. The upper edge of an air-feeding member 11 with an inside diameter of 14 mm. is spaced apart from the surface of the melt at a distance of 2800 mm., the air pressure at the base of the member 11 being equal to 1.5 atm. gauge. A working temperature of 1240°C is maintained in the compartment 3, the glass meniscus temperature ranging between 1035° and 1040°C. The tube temperature at the point of breaking-off is 350°C, air temperature at the outlet of the glass tube being 340°–350°C.

Another example illustrating the fabrication of glass tubes may be considered. Its distinguishing feature is the creation of rarefaction in the tube annealing range which is attained by drawing off the forming air in a counterflow for sucking ambient cooling (atmospheric) air inside the tube with the air of a fan.

To create rarefaction in the annealing range, a tubular member 11 is mounted inside the tube being made, the member being adapted to draw air from the forming and annealing sections.

The process of manufacturing a glass tube is effected as follows:

At first, a cooler 9 is arranged outside of the compartment 3 and located in the bottom portion of the pit 2. The temperature in the compartment 3 is maintained in excess of the working temperature by 30°–50°C. Next, a bait is introduced into the melt along the pit 2 at a depth of 150–200 mm. and arranged around the ceramic bushing 6. After that, the cooler 9 is lowered into the compartment 3 so that the spacing between its bottom surface and the surface of the melt is equal to 100–150 mm. Following that the burners heating the compartment 3 are cut out with an ensuing drop in the temperature within the compartment. As soon as the temperature below the working temperature by 50°C is attained, an electric motor (not shown in the drawing) is switched in, the motor being adapted to lift the bait with the melt and simultaneously to rotate the guide rolls 1 with a speed equal to the bait lifting speed. When the bait passes two first pairs of the guide rolls, the gas burners are cut in to raise the temperature in the compartment to the working temperature at which the tube of a requisite size is drawn. In making tubes 30–200 mm. in diameter, a temperature of from 1230° to 1260°C is maintained in the compartment 3, the temperature of the meniscus being in this case equal to 1030°–1070°C.

After the bait has emerged from the pit 2 of the upright drawing plant and has been separated from the tube 10 being drawn, a suction device is cut in to draw the air from the interior of the tube being formed along arrow C through a heat-resistant pipe 7. The rarefaction at the lower base of the pipe 7 amounts to 250-320 mm. Hg and is chosen so that the rate of cooling of the tube interior in the annealing section is equal to that of the tube exterior. The annealing of a glass tube in the above manner insures symmetrical distribution of residual stresses along the thickness of the tube wall.

The diameter and wall thickness of the tube being manufactured are adjusted by displacing the cooler 9 with respect to the surface of the melt, adjusting the tube drawing speed and water temperature in the cooler.

As the cooler approaches the surface of the melt, the wall thickness will increase. A higher drawing speed results in a reduction in the tube diameter and a concurrent reduction in the wall thickness. The output of the hereinbefore described upright glass tube drawing plant is 6–9 tons of the melt per 24 hrs.

What we claim is:

1. A method of making a glass tube comprising the following steps: the upright drawing of a melt from the free surface of the melt; supplying air to the inside of the tube being made; imparting geometric form to said tube under the effect of said air which is heated in a forming section; effecting a continuous vertical transfer of the tube being formed; annealing the tube being formed by causing a movement of cooling fluid in an annealing section spaced above the forming section for effecting concurrent cooling of said tube from the inside in the annealing section and subsequent cooling of the tube to an ambient temperature in the course of continuous vertical movement of the said tube.

2. A method as claimed in claim 1 wherein to provide forced cooling of the tube from the inside a gaseous coolant which flowes in parallel with the tube and a forming air flow are introduced into the annealing section through a tubular member arranged inside the tube.

3. A method as claimed in claim 2 wherein the air and gaseous coolant are introduced into the tube at different levels.

4. A method as claimed in claim 3 wherein the coolant is air, flue gas or water vapor.

5. A method as claimed in claim 2 wherein said coolant flows in countercurrent to said tube.

6. A method as claimed in claim 2 wherein said coolant flows in the direction in which said tube moves.

* * * * *